United States Patent
Murota

(10) Patent No.: US 8,389,436 B2
(45) Date of Patent: Mar. 5, 2013

(54) COMPOSITE OXIDE

(75) Inventor: Tadatoshi Murota, Kobe (JP)

(73) Assignee: Santoku Corporation, Hyogo (JP)

( * ) Notice: Subject to any disclaimer, the term of this patent is extended or adjusted under 35 U.S.C. 154(b) by 140 days.

(21) Appl. No.: 12/867,033

(22) PCT Filed: Feb. 12, 2009

(86) PCT No.: PCT/JP2009/052321
§ 371 (c)(1),
(2), (4) Date: Nov. 2, 2010

(87) PCT Pub. No.: WO2009/101984
PCT Pub. Date: Aug. 20, 2009

(65) Prior Publication Data
US 2011/0064639 A1 Mar. 17, 2011

(30) Foreign Application Priority Data

Feb. 12, 2008 (JP) .................... 2008-061824

(51) Int. Cl.
- *B01J 23/00* (2006.01)
- *B01J 21/00* (2006.01)
- *B01J 27/135* (2006.01)
- *B01J 23/10* (2006.01)
- *C01F 17/00* (2006.01)

(52) U.S. Cl. ........ 502/304; 502/227; 502/242; 502/303; 502/308; 502/349; 423/263

(58) Field of Classification Search .......... 502/227, 502/242, 302–304, 308, 349; 423/263
See application file for complete search history.

(56) References Cited

U.S. PATENT DOCUMENTS

| | | | | |
|---|---|---|---|---|
| 5,532,198 A * | 7/1996 | Chopin et al. | ................ | 502/304 |
| 5,607,892 A * | 3/1997 | Chopin et al. | ................ | 502/304 |
| 5,693,299 A * | 12/1997 | Chopin et al. | ............. | 423/213.2 |
| 5,712,218 A * | 1/1998 | Chopin et al. | ................ | 502/304 |
| 5,837,642 A * | 11/1998 | Tanaka et al. | ................ | 502/304 |
| 5,883,037 A * | 3/1999 | Chopin et al. | ................ | 502/308 |
| 5,888,464 A * | 3/1999 | Wu et al. | ..................... | 423/213.5 |
| 5,898,014 A * | 4/1999 | Wu et al. | ..................... | 502/302 |

(Continued)

FOREIGN PATENT DOCUMENTS

| | | |
|---|---|---|
| CN | 1546228 A | 11/2004 |
| EP | 0709351 A1 | 5/1996 |

(Continued)

OTHER PUBLICATIONS

Hiroshi Matsui, et al., "Sanka Cerium-Sanca Zirconium Kagobutsu no Suiso Gus ni yoru kangen Hanno," Japanese Conference on Calorimentry and Thermal Analysis, Oct. 15, 1993, pp. 132-133, vol. 29.

*Primary Examiner* — Cam N. Nguyen
(74) *Attorney, Agent, or Firm* — Sughrue Mion, PLLC

(57) ABSTRACT

A composite oxide is provided which has large oxygen absorption and desorption over a wide temperature range, in particular in a higher temperature range of not lower than 700° C. and/or in a lower temperature range of not higher than 400° C. The composite oxide contains oxygen, R composed of at least one of Ce and Pr, and Zr at a particular ratio, and optionally a particular ratio of M composed of at least one element selected from alkaline earth metals and the like.

14 Claims, 1 Drawing Sheet

U.S. PATENT DOCUMENTS

| | | | |
|---|---|---|---|
| 5,908,800 A * | 6/1999 | Bonneau et al. | 501/103 |
| 5,945,370 A | 8/1999 | Yokoi et al. | |
| 6,107,240 A * | 8/2000 | Wu et al. | 502/304 |
| 6,171,572 B1 | 1/2001 | Aozasa | |
| 6,248,688 B1 * | 6/2001 | Wu et al. | 502/302 |
| 6,255,242 B1 * | 7/2001 | Umemoto et al. | 501/103 |
| 6,387,338 B1 * | 5/2002 | Anatoly et al. | 423/239.1 |
| 6,458,741 B1 * | 10/2002 | Roark et al. | 502/303 |
| 6,468,941 B1 * | 10/2002 | Bortun et al. | 502/300 |
| 6,764,665 B2 * | 7/2004 | Deeba et al. | 423/239.1 |
| 6,831,036 B1 * | 12/2004 | Yamazaki et al. | 502/327 |
| 7,235,511 B2 * | 6/2007 | Kawamoto et al. | 502/327 |
| 7,307,039 B2 * | 12/2007 | Iwakuni et al. | 502/304 |
| 7,939,041 B2 * | 5/2011 | Darab | 423/263 |
| 7,943,104 B2 * | 5/2011 | Kozlov et al. | 423/213.5 |

FOREIGN PATENT DOCUMENTS

| | | |
|---|---|---|
| JP | 8-109020 A | 4/1996 |
| JP | 9-278444 A | 10/1997 |
| JP | 10-194742 A | 7/1998 |
| JP | 2000-072447 A | 3/2000 |
| JP | 2001-113168 A | 4/2001 |
| JP | 2004-344878 A | 12/2004 |
| JP | 2004-345942 A | 12/2004 |
| JP | 2006-068728 A | 3/2006 |

* cited by examiner

COMPOSITE OXIDE

CROSS REFERENCE TO RELATED APPLICATIONS

This application is a National Stage of International Application No. PCT/JP2009/052321 filed Feb. 12, 2009, which claims priority from Japanese Patent Application No. 2008-061824, filed Feb. 12, 2008, the contents of all of which are incorporated herein by reference in their entirety.

FIELD OF ART

The present invention relates to a composite oxide, in particular a composite oxide which may suitably be used as a co-catalyst for an exhaust gas purifying catalyst that purifies exhaust gas from an engine running on gasoline or light oil, and as an oxygen reduction catalyst for fuel cells.

BACKGROUND ART

Exhaust gas from internal combustion engines of vehicles and the like contain hydrocarbons, carbon monoxide, and nitrogen oxide, which are harmful to human body and environment. As a catalyst for purifying vehicle exhaust gas, so-called a three way catalyst is used, which oxidizes carbon monoxide and hydrocarbons into carbon dioxide and water, and reduces nitrogen oxide into nitrogen and water. A three way catalyst is composed, for example, of precious metals Pt, Pd, and Rh as a main catalyst, and an oxide or a composite oxide containing cerium oxide as a co-catalyst, both carried on a catalyst support of alumina, cordierite, or the like. A co-catalyst absorbs oxygen due to change of valency of Ce contained therein from three to four under an oxidizing atmosphere, and desorbs oxygen due to change of the cerium valency from four to three under a reducing atmosphere, which is so-called oxygen absorbing and desorbing capability. This oxygen absorbing and desorbing capability mitigates abrupt change in an exhaust gas atmosphere caused by acceleration and deceleration of an engine, so as to allow the main catalyst to purify exhaust gas at high efficiency. As a co-catalyst, composite oxides containing Ce and Zr are widely used. However, currently used composite oxides with Ce and Zr do not have sufficient oxygen absorbing and desorbing capability. In particular, the amount of oxygen absorption and desorption of these composite oxides is small at lower temperatures of 400° C. or lower, so that no mitigation of change in an exhaust gas atmosphere is exhibited when the engine temperature is low, e.g., at the engine start, which makes the exhaust gas purifying effect of the main catalyst low.

On the other hand, development of polymer electrolyte fuel cells (PEFC) has advanced, but a high cost of platinum catalyst, which is used both in anodes and cathodes, impedes practical application and popularization of PEFC. The oxygen reduction reaction at the cathode, $1/2O_2 + 2H^+ + 2e^- \rightarrow H_2O$, particularly requires a large amount of platinum catalyst. Thus catalyst materials have been actively developed which can substitute or reduce the amount of platinum catalyst to be used.

As a composite oxide usable as a catalyst material, for example, Patent Publication 1 discloses a composite oxide having oxygen absorbing and desorbing capability, which contains cerium oxide, zirconium oxide, and hafnium oxide, the composite oxide including φ' phase as a crystal phase and having oxygen absorbing and desorbing capability of at least 100 μmol/g at 400 to 700° C.

Patent Publication 2 discloses a zirconium-cerium composite oxide containing zirconium and cerium at a weight ratio in the range of 51 to 95:49 to 5 in terms of oxides, the composite oxide having a specific surface area of not smaller than 50 m²/g after calcination at 500 to 1000° C., and capable of maintaining a specific surface area of not smaller than 20 m²/g even after heating at 1100° C. for 6 hours.

Patent Publication 3 discloses use of a composite oxide as a co-catalyst, the composite oxide being composed of praseodymium oxide and zirconium oxide, and having a specific surface area of as large as 10 m²/g or more. The disclosed composite oxide has high oxygen absorbing and desorbing capability even at low temperatures of 200° C. to 350° C.

Patent Publication 4 discloses an exhaust gas purifying catalyst having a honeycomb support and a catalyst layer formed thereon which contains a Zr—Pr composite oxide carrying precious metals. The disclosed exhaust gas purifying catalyst is characterized by providing a low light-off temperature of hydrocarbons.

Patent Publication 5 discloses use of a composite oxide composed of Ce, and Pr or Tb, and Zr as a co-catalyst. The disclosed composite oxide exhibits good oxidation-reduction capability even in exhaust gas generated by combustion of a lean (fuel is rarefied) air-fuel mixture.

Patent Publication 1: JP-8-109020-A
Patent Publication 2: JP-10-194742-A
Patent Publication 3: JP-2001-113168-A
Patent Publication 4: JP-2006-68728-A
Patent Publication 5: JP-2000-72447-A The composite oxides disclosed in Patent Publications 1 to 5, however, do not yet have sufficient oxygen absorbing and desorbing capabilities. In particular, the amount of oxygen absorption and desorption at low temperatures of 400° C. or lower is still small.

SUMMARY OF THE INVENTION

It is an object of the present invention to provide a composite oxide having large oxygen absorption and desorption over a wide temperature range, in particular a composite oxide having large oxygen absorption and desorption in a higher temperature range of not lower than 700° C. and/or in a lower temperature range of not higher than 400° C., and suitable for use as a co-catalyst for exhaust gas purifying catalysts, an oxygen reduction catalyst for fuel cells, or the like.

According to the present invention, there is provided a composite oxide comprising oxygen, R consisting of at least one element selected from Ce and Pr, and Zr, wherein a content of R is not less than 10 at % and not more than 90 at % and a content of Zr is not less than 10 at % and not more than 90 at %, with a total amount of elements other than oxygen being 100 at %, wherein said composite oxide is free of a tetragonal crystal phase originated from zirconium oxide, and wherein an electron diffraction pattern of said composite oxide appears as dotted diffraction spots.

According to the present invention, there is also provided a composite oxide comprising: oxygen, R consisting of at least one element selected from Ce and Pr, Zr, and M consisting of at least one element selected from alkaline earth metals, rare earth elements other than R, transition metal elements other than rare earth elements and Zr, halogen elements, B, C, Si, and S, wherein a content of R is not less than 10 at % and not more than 90 at %, a content of Zr is not less than 10 at % and less than 90 at %, and a content of M is more than 0 at % and not more than 20 at %, with a total amount of elements other than oxygen being 100 at %, wherein said composite oxide is free of a tetragonal crystal phase originated from zirconium oxide, and wherein an electron diffraction pattern of said composite oxide appears as dotted diffraction spots.

Having the above-described structure, the composite oxide according to the present invention has large oxygen absorption and desorption over a wide temperature range, in particular in a higher temperature range of not lower than 700° C. and/or a lower temperature range of not higher than 400° C., even if the composite oxide does not usually have a large specific surface area, which has conventionally been believed to be requisite in the field of art. Thus the composite oxide according to the present invention may suitably be used as a co-catalyst for exhaust gas purifying catalysts, an oxygen reduction catalyst for fuel cells, and the like.

PREFERRED EMBODIMENTS OF THE INVENTION

Figure 1:
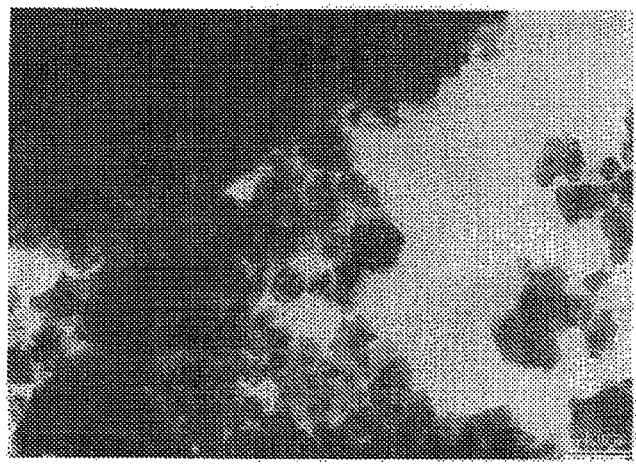
FIG. 1 is a photocopy of a TEM image of a composite oxide prepared in Example 1.

The present invention will now be explained in detail.

The composite oxide according to the present invention contains oxygen, R consisting of at least one element selected from Ce and Pr, and Zr as essential components, and optionally M consisting of at least one element selected from alkaline earth metals, rare earth elements other than R, transition metal elements other than rare earth elements and Zr, halogen elements, B, C, Si, and S.

According to the present invention, the contents of the components other than oxygen are not less than 10 at % and not more than 90 at % of R and not less than 10 at % and not more than 90 at % of Zr, based on the total amount of the elements other than oxygen being 100 at %. When M is contained, the content of R is not less than 10 at % and not more than 90 at %, the content of Zr is not less than 10 at % and less than 90 at %, preferably not less than 10 at % and not more than 89.9 at %, and the content of M is more than 0 at % and not more than 20 at %, preferably not less than 0.1 at % and not more than 20 at %.

R represents an element that exhibits oxygen absorbing and desorbing capability, of which Pr contributes to oxygen absorption and desorption mainly in a lower temperature range of not higher than 400° C., and Ce mainly in a higher temperature range of not lower than 700° C.

Zr improves the rate of oxidation and reduction (rate of utilization) of Pr and Ce, and affects the temperature range in which these elements exhibit oxygen absorbing and desorbing capability. Industrially speaking, zirconium salts may contain some atomic percents of Hf, in which case Hf contained in zirconium used in the present invention is treated with Zr. Accordingly, Hf is not included in element M.

When both Ce and Pr are contained as R, high oxygen absorbing capability may be achieved both in the lower and higher temperature ranges as discussed above.

According to the present invention, the contents of R and Zr and the contents of Pr and Ce in R may suitably be decided from the above-mentioned ranges, depending on the temperature ranges in which the desired oxygen absorbing and desorbing capability is to be exhibited and the amount of oxygen absorbed and desorbed in each temperature range.

For example, for large oxygen absorption and desorption particularly in a lower temperature range of not higher than 400° C., specifically, for desorption of not less than 300 µmol/g of oxygen at 400° C., the content of Ce is not less than 0 at % and not more than 70 at % and the content of Pr is not less than 20 at % and not more than 90 at %, or the content of Ce is more than 0 at % and not more than 70 at % and the content of Pr is not less than 20 at % and less than 90 at %, and the content of Zr is not less than 10 at % and not more than 80 at %; or the content of Ce is not less than 0 at % and not more than 70 at % and the content of Pr is not less than 20 at % and not more than 90 at %, or the content of Ce is more than 0 at % and not more than 70 at % and the content of Pr is not less than 20 at % and less than 90 at %, the content of Zr is not less than 10 at % and less than 80 at %, preferably not less than 10 at % and not more than 79.9 at %, and the content of M is more than 0 at % and not more than 20 at %, preferably not less than 0.1 at % and not more than 20 at %, based on the total amount of the elements other than oxygen being 100 at %.

Alternatively, for example, for large oxygen absorption and desorption particularly in a higher temperature range of not lower than 700° C., specifically, for desorption of not less than 600 µmol/g of oxygen at 700° C., the content of Ce is not less than 20 at % and not more than 90 at % and the content of Pr is not less than 0 at % and not more than 70 at %, or the content of Ce is not less than 20 at % and less than 90 at % and the content of Pr is more than 0 at % and not more than 70 at %, and the content of Zr is not less than 10 at % and not more than 70 at %; or the content of Ce is not less than 20 at % and not more than 90 at % and the content of Pr is not less than 0 at % and not more than 70 at %, or the content of Ce is not less than 20 at % and less than 90 at % and the content of Pr is more than 0 at % and not more than 70 at %, and the content of Zr is not less than 10 at % and less than 70 at %, preferably not less than 10 at % and not more than 69.9 at %, and the content of M is more than 0 at % and not more than 20 at %, preferably not less than 0.1 at % and not more than 20 at %, based on the total amount of the elements other than oxygen being 100 at %. In any of these compositions, the content of R is not less than 30 at % and not more than 90 at %, preferably not less than 60 at % and not more than 90 at %.

Further, for example, for particularly large oxygen absorption and desorption in a lower temperature range of not higher than 400° C., and at the same time in a higher temperature range of not lower than 700° C., specifically, for desorption of not less than 300 µmol/g of oxygen at 400° C. and at the same time not less than 600 µmol/g at 700° C., the content of Ce is not less than 20 at % and not more than 90 at % and the content of Pr is not less than 0 at % and not more than 70 at %, or the content of Ce is not less than 20 at % and less than 90 at % and the content of Pr is not less than 0 at % and not more than 70 at %, and the content of Zr is not less than 10 at % and not more than 60 at %; or the content of Ce is not less than 20 at % and not more than 90 at % and the content of Pr is not less than 0 at % and not more than 70 at %, or the content of Ce is not less than 20 at % and less than 90 at % and the content of Pr is more than 0 at % and not more than 70 at %, the content of Zr is not less than 10 at % and less than 60 at %, preferably not less than 10 at % and not more than 59.9 at %, and the content of M is more than 0 at % and not more than 20 at %, preferably not less than 0.1 at % and not more than 20 at %, based on the total amount of the elements other than oxygen being 100 at %. In any of these compositions, the content of R is not less than 40 at % and not more than 90 at %, preferably not less than 60 at % and not more than 90 at %.

In the composite oxide of the present invention, M is an alkaline earth metal, such as Mg, Ca, Sr, or Ba; a rare earth element other than R, such as Sc, Y, La, Nd, or Tb; a transition metal element other than rare earth elements and Zr, such as Ti, V, Nb, Ta, Cr, Mo, W, Mn, Fe, Co, Ni, Pd, Pt, Cu, Ag, Zn, Al, Ga, In, Ge, Sn, or Bi; a halogen element, such as F or Cl; B, C, Si, or S. Inclusion of Fe, Co, Ni, Cu, Mn, Ti, or Sn increases the amount of oxygen absorption and desorption, which is thus preferred. Elements other than these may be contained as inevitable impurities.

An electron diffraction pattern of the composite oxide of the present invention appears as diffraction spots.

According to the present invention, an electron diffraction pattern is determined by field-limiting method at a 0.1 μm diameter under a transmission electron microscope. Since an electron diffraction pattern is sensitive to the crystallinity of a sample, it is used for analyzing the crystallinity or structure of various materials. A composite oxide showing dotted diffraction spots is of a single crystal structure. Incidentally, according to the present invention, streak diffraction patterns also fall under the category of spots.

On the other hand, a composite oxide showing a ring-shaped electron diffraction pattern is of a polycrystalline structure. For example, even with the same composition, the composite oxide according to the present invention of which electron diffraction pattern appears as dotted diffraction spots, has larger oxygen absorption and desorption in a particular temperature range compared to a conventional material of which electron diffraction pattern appears as diffraction rings.

The composite oxide according to the present invention is free of a tetragonal crystal phase originated from zirconium oxide. The presence/absence of a tetragonal crystal phase originated from zirconium oxide may be determined by X-ray diffraction, of which conditions are as follows:
target: copper; tube voltage: 40 kV; tube current: 40 mA; divergence slit: 1°; scattering slit: 1°; receiving slit: 0.15 mm; operation mode: continuous; scan step: 0.01°; scan speed: 5°/min.

When determined under such conditions, the diffraction peak characteristic of a tetragonal crystal phase originated from zirconium oxide is a peak in the (101) plane appearing around 30° or a peak in the (002) plane appearing around 34°. Absence of both of these peaks in the result of measurement indicates that the sample is free of a tetragonal crystal phase originated from zirconium oxide. In particular, a composite oxide which is free of a tetragonal crystal phase originated from zirconium oxide and composed solely of $CaF_2$-type and/or $CaF_2$-like phase has improved oxygen absorption and desorption. $CaF_2$-like phase means a crystal phase which can be indexed as $CaF_2$-type phase by X-ray diffraction.

With the conventional materials, the oxygen absorption and desorption have been increased by extending the reaction area, i.e., by making the crystal structure polycrystalline and increasing the specific surface area. The present inventors, however, have revealed that a composite oxide of which electron diffraction pattern appears as diffraction spots has large oxygen absorption and desorption even with a small specific surface area. Though the basis for this fact is not certainly revealed, it is believed that the high crystallinity of the composite oxide of the present invention causes oxygen inside the composite oxide to move smoothly, which oxygen is not usually involved in the absorption and desorption. Thus the composite oxide of the present invention is believed to be able to achieve large oxygen absorption and desorption over a wide composition range without necessarily increasing the specific surface area as in the conventional composite oxides. The present composite oxide has a particularly excellent effect in a lower temperature range of not higher than 400° C., in which the oxygen diffusion rate is low, compared to the conventional materials.

The specific surface area of the present composite oxide is preferably not larger than 2 $m^2/g$, and the minimum is usually about 0.1 $m^2/g$. With the specific surface area of not larger than 2 $m^2/g$, the electron diffraction pattern of the composite oxide may easily be controlled to appear as diffraction spots.

The specific surface area of the composite oxide referred to in the present invention is measured according to the BET method utilizing absorption of nitrogen gas.

The composite oxide of the present invention preferably has a primary particle size of not smaller than 50 nm. With this size, an electro diffraction pattern of the composite oxide may easily be controlled to appear as diffraction spots.

The primary particle size of the present composite oxide is determined as an average of the longitudinal diameters of twenty particles selected at random on a ×75000 TEM image.

The amount of oxygen desorbed by the present composite oxide at 400° C. is preferably not less than 300 μmol/g, more preferably not less than 400 μmol/g. The maximum oxygen desorption is not particularly limited, but is usually not more than 1000 μmol/g.

The amount of oxygen desorbed by the present composite oxide at 700° C. is preferably not less than 600 μmol/g, more preferably not less than 800 μmol/g. The maximum oxygen desorption is not particularly limited, but is usually not more than 1300 μmol/g.

The amount of oxygen desorbed by the composite oxide of the present invention is preferably not less than 300 μmol/g at 400° C. and not less than 600 μmol/g at 700° C., more preferably not less than 400 μmol/g at 400° C. and not less than 800 μmol/g at 700° C.

The amount of oxygen desorbed by the present composite oxide is determined with a gas adsorption system according to the following method. First, in a flow of hydrogen gas at 0.07 MPa, 50 mg of a sample is heated to a predetermined temperature over 1 hour, and then held as it is for 10 minutes. After that, the sample is maintained at a predetermined temperature until the measurement is completed. The sample is reduced in a flow of hydrogen gas at 0.07 MPa for 15 minutes, after which the hydrogen gas is sufficiently substituted by flowing He gas. 1 cc of oxygen, which has been measured out precisely with a measurement tube, is introduced into a sample tube to oxidize the sample. The amount of oxygen consumed is quantified with a TCD (thermal conductivity detector), and taken as the amount of oxygen desorption (μmol/g).

A method for preparing the composite oxide of the present invention is not particularly limited, and may include heat treatment of a precursor prepared by a wet method, of which example is discussed below.

First prepared are a starting material aqueous solution containing R ions, Zr ions, and optionally ions of at least one M, and an alkaline aqueous solution. The starting material aqueous solution is prepared by dissolving salts of R, Zr, and M in water. Salts of R and Zr may be nitrates, sulfates, or acetates thereof. A salt of M may be a suitably selected water-soluble salt. The starting material aqueous solution may preferably have a concentration of 0.1 to 5 mol/l in terms of R, Zr, and M in total.

The alkaline aqueous solution may be prepared by dissolving, in water, ammonium, sodium hydroxide, potassium hydroxide, ammonium hydrogen carbonate, sodium carbonate, sodium hydrogen carbonate, or the like. Preferably, the alkaline aqueous solution may contain alkali in an amount of 1.1 to 5 times the theoretical amount required for neutralizing and precipitating the R ions, Zr ions, and M ions contained in the starting material salt aqueous solution.

Next, while the alkaline aqueous solution is stirred with a stirrer, the starting material aqueous solution is added thereto to prepare a precursor. The precursor is obtained in the form of aqueous slurry. For preparing the present composite oxide, it is preferred to add the starting material aqueous solution to the alkaline aqueous solution. So-called reverse addition can improve the dispersity (homogeneity) of R, Zr, and M in the precursor. The conditions such as the extent of stirring, the rate of adding the starting material aqueous solution, and the concentrations of the alkaline solution and the starting material aqueous solution may suitably be decided as long as the desired improvement in dispersity of the constituent elements is achieved. Usually, a homogeneous precursor results from stirring with larger shear force, a slower rate of addition of the starting material aqueous solution, a higher concentration of the alkaline solution, and a lower concentration of the starting material aqueous solution. A precursor having higher dispersity of the constituent elements is more likely to undergo uniform growth among the crystal grains when calcined under an oxidizing atmosphere, and assume a single crystal structure, thus tending to have high crystallinity. This means that such a precursor may lead to easy control of a resulting composite oxide to be free of a tetragonal crystal phase originated from zirconium oxide, and to show electron diffraction spots.

The precursor may be subjected to a hydrothermal treatment. For the hydrothermal treatment, the slurry of the precursor and water may be placed in an autoclave as it is, or after the concentration of the salts dissolved in the slurry is adjusted by discarding the supernatant or by dilution with water, or the pH of the slurry is suitably adjusted with acid or alkali. The hydrothermal treatment may be carried out at usually not lower than 80° C. and not higher than 300° C.

Next, the precursor is recovered from the slurry. The recovery may be carried out by filtration, for example, with a Nutsche filter or a filter press, or by centrifugation. Upon recovery, the precursor may preferably be washed. The washing may be carried out by a conventional method, such as decantation. The recovered precursor may be dried before subjected to calcination. Alternatively, a dry precursor may directly be obtained by spray-drying the slurry.

The recovered precursor is then calcined under an oxidizing atmosphere, to give the composite oxide. The conditions of the calcination are not particularly limited as long as the precursor is decomposed and oxidized into a composite oxide and an electron diffraction pattern of the resulting composite oxide appears as diffraction spots, and may usually be not lower than 1000° C. and not higher than 1200° C. for not less than 0.5 hours and not more than 24 hours. Calcination at preferably not lower than 1050° C., more preferably not lower than 1100° C., likely results in uniform growth among crystal grains to give a single crystal structure, thus tending to increase the crystallinity, which, though, may depend on the property of the precursor. In this way, an electron diffraction pattern of the composite oxide may easily be controlled to appear as diffraction spots.

The calcination may alternatively be carried out in two steps. For example, in the first calcination step, the precursor may be calcined at a temperature of not lower than 200° C. and not higher than 500° C. for not less than 0.5 hours and not more than 24 hours, and in the second calcination step, at a temperature of not lower than 1000° C. and not higher than 1200° C. for not less than 0.5 hours and not more than 24 hours.

The composite oxide of the present invention may be obtained through calcination under an oxidizing atmosphere as discussed above, or also through calcination under an oxidizing atmosphere followed by calcination under a reducing atmosphere.

The calcination under a reducing atmosphere may be carried out usually at not lower than 800° C., preferably not lower than 1000° C. and not higher than 1200° C. for not less than 0.5 hours and not more than 24 hours. The calcination under a reducing atmosphere may also be carried out in two steps as is the calcination under an oxidizing atmosphere.

The calcination under a reducing atmosphere may be carried out under a reducing atmosphere containing hydrogen or carbon monoxide, or under an atmosphere of inert gas, such as argon or helium. It is preferred from a cost point of view to carry out the calcination under an atmosphere of an inert gas-hydrogen mixed gas. The calcination under a reducing atmosphere can improve the crystallinity, which leads to large oxygen absorption and desorption. This effect is particularly remarkable when Ce as R is contained.

Following the calcination under a reducing atmosphere, calcination may again be carried out under an oxidizing atmosphere. This calcination may be carried out in the same way as the previous calcination of the precursor. Subsequently, calcination under a reducing atmosphere and an oxidizing atmosphere may suitably be carried out similarly.

M, if contained in the present composite oxide, may be added in any manner, such as by coprecipitation as discussed above, by a solid-phase method wherein a precursor or a composite oxide containing R and Zr is mixed with a compound of M and calcined, or by an impregnation method wherein a precursor or a composite oxide containing R and Zr is impregnated with a solution of M and calcined.

When at least one of Fe, Co, Ni, Cu, Mn, Ti, and Sn is used as element M, the impregnation method is preferred. Though the basis for this fact is not certainly known, these elements are present in the surface layer of the composite oxide, assist oxygen to move smoothly at lower temperatures, and may bring out the oxygen absorbing and desorbing capability even at 200° C. or lower.

EXAMPLES

The present invention will now be explained in more detail with reference to Examples and Comparative Examples, which are illustrative only and do not intend to limit the present invention.

Incidentally, in the following Examples and Comparative Examples, the composition of each resulting composite oxide was observed to be the same as that of the starting material, as determined with an ICP atomic emission spectrometer.

The presence/absence of a tetragonal crystal phase originated from zirconium oxide, the amount of oxygen desorption, and the specific surface area were measured by the methods discussed above.

Example 1

An aqueous solution of cerium nitrate (manufactured by RHODIA ELECTRONICS AND CATALYSIS) and an aqueous solution of zirconyl nitrate (manufactured by SANTOKU CORPORATION) were mixed at a ratio of 20 at % Ce and 80 at % Zr based on the total amount of Ce and Zr being 100 at %, and diluted with pure water to prepare a starting material aqueous solution containing Ce and Zr in total of 0.5 mol/l. On the other hand, a 4 mol/l aqueous ammonia solution was prepared as an alkaline aqueous solution. One liter of the starting material aqueous solution was added into 2.7 l of the alkaline aqueous solution under stirring over 10 minutes to prepare a precursor. Nutsche filtration and washing by decantation were repeated five times. The resulting precursor was calcined in the air at 400° C. for 5 hours, pulverized in an automatic mortar, calcined again in the air at 1200° C. for 2 hours, and pulverized again in an automatic mortar, to thereby give a composite oxide.

Figure 2:
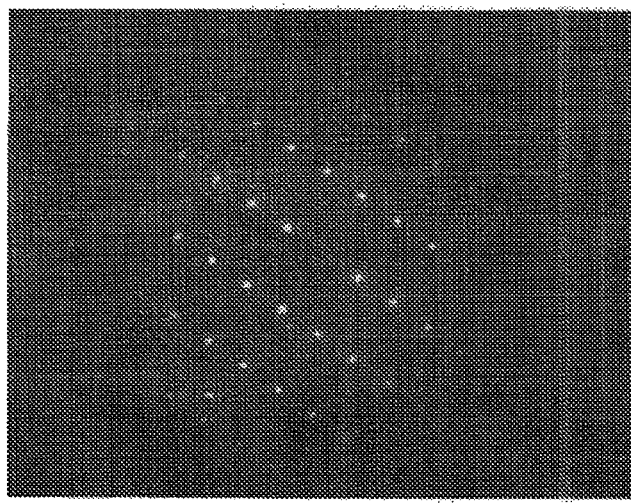
FIG. 2 is a photocopy of an electron diffraction pattern of a composite oxide prepared in Example 1.

The composite oxide thus obtained was observed under a transmission electron diffractometer. A photocopy of a ×75000 TEM image is shown in FIG. 1. A photocopy of an electron diffraction pattern of the area of a 0.1 μm diameter around the arrow in FIG. 1 determined by field-limiting method is shown in FIG. 2. FIG. 2 shows that the diffraction pattern appears as dotted diffraction spots. The amount of oxygen desorbed by the composite oxide was measured to be 0 μmol/g at 200° C., 103 μmol/g at 400° C., and 350 μmol/g at 700° C. The specific surface area of the composite oxide was measured to be 0.5 m$^2$/g. The results are shown in Table 1, together with the presence/absence of a tetragonal crystal phase originated from zirconium oxide.

Examples 2 to 11

Composite oxides were prepared in the same way as in Example 1, except that the composition of each starting material aqueous solution was as shown in Table 1. The sources of Co, Fe, Ni, and Cu added to the starting material aqueous solution were aqueous solutions of cobalt nitrate, iron nitrate, nickel nitrate, and copper nitrate (each prepared using a respective salt manufactured by WAKO PURE CHEMICALS INDUSTRIES, LTD.), respectively. The composite oxides thus obtained were subjected to the same measurements as in Example 1. The results are shown in Table 1.

Example 12

10 g of the composite oxide prepared in Example 1 was calcined at 1100° C. for 1 hour in a flow of hydrogen at 2 l/min, and calcined in the air at 700° C. for 5 hours, to thereby give a composite oxide. This composite oxide was subjected to the same measurements as in Example 1. The results are shown in Table 1.

Examples 13 to 22

Each of the composite oxides prepared in Examples 2 to 11 was subjected to further reduction and oxidization in the same way as in Example 12, to thereby give a composite oxide. These composite oxides were subjected to the same measurements as in Example 1. The results are shown in Table 1.

Example 23

An aqueous solution of cerium nitrate (manufacture by RHODIA ELECTRONICS AND CATALYSIS) and an aqueous solution of zirconyl nitrate (manufactured by SANTOKU CORPORATION) were mixed at a ratio of 50 at % Ce and 48 at % Zr based on the total amount of Ce and Zr being 100 at %, and diluted with pure water to prepare a starting material aqueous solution containing Ce and Zr in total of 0.5 mol/l. On the other hand, a 4 mol/l aqueous ammonia solution was prepared as an alkaline aqueous solution. One liter of the starting material aqueous solution was added into 2.7 l of the alkaline aqueous solution under stirring over 10 minutes to prepare a precursor. Nutsche filtration and washing by decantation were repeated five times.

The resulting precursor was calcined in the air at 400° C. for 5 hours, and pulverized in an automatic mortar. 20 g of the oxide containing Ce and Zr thus obtained was impregnated with a 0.5 mol/l aqueous solution of cobalt nitrate, and heated under stirring to evaporate the water. Then the resulting product was calcined in the air at 400° C. for 5 hours, pulverized in an automatic mortar, further calcined at 1200° C. for 2 hours, and pulverized in an automatic mortar. 10 g of the resulting oxide was calcined at 1100° C. for 1 hour in a flow of hydrogen at 2 l/min, and then in the air at 700° C. for 5 hours, to thereby give a composite oxide.

The composition of the composite oxide thus obtained was 50 at % Ce, 48 at % Zr, and 2 at % Co. This composite oxide was subjected to the same measurements as in Example 1. The results are shown in Table 1.

Examples 24 to 28

Composite oxides were prepared in the same way as in Example 23, except that the composition of each starting material aqueous solution of Ce and/or Pr and Zr was as shown in Table 1. As a solution with which the oxide was impregnated, an aqueous solution of cobalt nitrate, iron nitrate, nickel nitrate, or copper nitrate (each prepared using a respective salt manufactured by WAKO PURE CHEMICALS INDUSTRIES, LTD.) was used according to the composition shown in Table 1.

The composite oxides thus obtained were subjected to the same measurements as in Example 1. The results are shown in Table 1.

Examples 29 to 35

Composite oxides were prepared in the same way as in Example 1, except that the composition of each starting material aqueous solution was as shown in Table 1. The sources of Nd, Y, Mg, Al, Mn, Bi, and Tb were aqueous solutions of neodymium nitrate, yttrium nitrate, magnesium nitrate, aluminum nitrate, manganese nitrate, bismuth nitrate, and terbium nitrate (each prepared using a respective salt manufactured by WAKO PURE CHEMICALS INDUSTRIES, LTD.), respectively. Each of the composite oxide thus obtained was calcined at 1100° C. for 1 hour in a flow of hydrogen at 2 l/min in the same way as in Example 12, and then in the air at 700° C. for 5 hours, to thereby give a composite oxide.

The composite oxides thus obtained were subjected to the same measurements as in Example 1. The results are shown in Table 1.

TABLE 1

| | Ce (at %) | Pr (at %) | Zr (at %) | M (at %) | Electron diffraction pattern | Presence/ absence of zirconia tetragonal crystal phase | Oxygen desorption at 200° C. (µmol/g) | Oxygen desorption at 400° C. (µmol/g) | Oxygen desorption at 700° C. (µmol/g) | Specific suface area (m²/g) |
|---|---|---|---|---|---|---|---|---|---|---|
| Example 1 | 20 | | 80 | | spots | absent | 0 | 103 | 350 | 0.5 |
| Example 2 | 50 | | 48 | Co(2) | spots | absent | 0 | 215 | 723 | 0.3 |
| Example 3 | 70 | | 30 | | spots | absent | 0 | 160 | 751 | 0.6 |
| Example 4 | 80 | | 20 | | spots | absent | 0 | 183 | 779 | 0.6 |
| Example 5 | | 20 | 77 | Fe(3) | spots | absent | 0 | 341 | 353 | 1.2 |
| Example 6 | | 50 | 50 | | spots | absent | 0 | 364 | 418 | 1.5 |
| Example 7 | | 70 | 30 | | spots | absent | 0 | 387 | 396 | 1.8 |
| Example 8 | | 80 | 20 | | spots | absent | 0 | 410 | 403 | 1.9 |
| Example 9 | 30 | 20 | 49 | Ni(1) | spots | absent | 0 | 306 | 660 | 0.2 |
| Example 10 | 30 | 50 | 20 | | spots | absent | 0 | 339 | 612 | 0.4 |
| Example 11 | | 70 | 27 | Cu(3) | spots | absent | 150 | 391 | 402 | 1.5 |
| Example 12 | 20 | | 80 | | spots | absent | 0 | 158 | 367 | 0.1 |
| Example 13 | 50 | | 48 | Co(2) | spots | absent | 0 | 289 | 802 | 0.1 |
| Example 14 | 70 | | 30 | | spots | absent | 0 | 313 | 1071 | 0.2 |
| Example 15 | 80 | | 20 | | spots | absent | 0 | 323 | 1176 | 0.2 |
| Example 16 | | 20 | 77 | Fe(3) | spots | absent | 0 | 351 | 364 | 0.1 |
| Example 17 | | 50 | 50 | | spots | absent | 0 | 375 | 424 | 0.1 |
| Example 18 | | 70 | 30 | | spots | absent | 0 | 421 | 413 | 0.1 |
| Example 19 | | 80 | 20 | | spots | absent | 0 | 436 | 435 | 0.1 |
| Example 20 | 30 | 20 | 49 | Ni(1) | spots | absent | 0 | 405 | 827 | 0.1 |
| Example 21 | 30 | 50 | 20 | | spots | absent | 0 | 341 | 963 | 0.2 |
| Example 22 | | 70 | 27 | Cu(3) | spots | absent | 213 | 527 | 544 | 0.1 |
| Example 23 | 50 | | 48 | Co(2) | spots | absent | 0 | 294 | 817 | 0.1 |
| Example 24 | | 20 | 77 | Fe(3) | spots | absent | 0 | 358 | 371 | 0.1 |
| Example 25 | 30 | 20 | 49 | Ni(1) | spots | absent | 0 | 459 | 833 | 0.1 |
| Example 26 | | 70 | 27 | Cu(3) | spots | absent | 247 | 544 | 557 | 0.1 |
| Example 27 | 70 | | 25 | Cu(5) | spots | absent | 172 | 621 | 1025 | 0.1 |
| Example 28 | 70 | 10 | 17 | Cu(3) | spots | absent | 165 | 615 | 1190 | 0.1 |
| Example 29 | 20 | 30 | 49 | Nd(1) | spots | absent | 0 | 360 | 830 | 0.2 |
| Example 30 | 40 | 20 | 29 | Y(1) | spots | absent | 0 | 355 | 915 | 0.2 |
| Example 31 | | 80 | 19 | Mg(1) | spots | absent | 0 | 445 | 441 | 0.1 |
| Example 32 | | 70 | 29 | Al(1) | spots | absent | 0 | 430 | 428 | 0.1 |
| Example 33 | 80 | | 19 | Mn(1) | spots | absent | 0 | 333 | 1156 | 0.2 |
| Example 34 | 70 | | 29 | Bi(1) | spots | absent | 0 | 331 | 1088 | 0.1 |
| Example 35 | 60 | | 39 | Tb(1) | spots | absent | 0 | 306 | 944 | 0.1 |

Comparative Example 1

Figure 3:
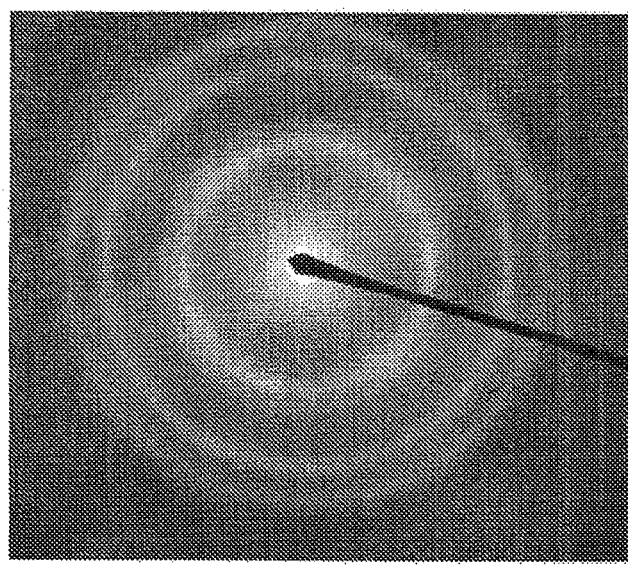
FIG. 3 is a photocopy of an electron diffraction pattern of a composite oxide prepared in Comparative Example 1.

A composite oxide was prepared in the same way as in Example 2, except that the calcination at 1200° C. for 2 hours was replaced with calcination at 800° C. for 3 hours. A photocopy of an electron diffraction pattern of the composite oxide thus obtained is shown in FIG. 3. The diffraction pattern appears as a ring form. The obtained composite oxide was also subjected to the same measurements as in Example 1. The results are shown in Table 2.

Comparative Example 2

An aqueous solution of cerium nitrate (manufactured by RHODIA ELECTRONICS AND CATALYSIS) and an aqueous solution of zirconyl nitrate (manufactured by SANTOKU CORPORATION) were mixed at a ratio of 80 at % Ce and 20 at % Zr based on the total amount of Ce and Zr being 100 at %, and diluted with pure water to prepare a starting material aqueous solution containing Ce and Zr in total of 0.5 mol/l. On the other hand, a 1 mol/l aqueous ammonia solution was prepared as an alkaline aqueous solution. 2.7 l of the alkaline aqueous solution was added into 1 l of the starting material aqueous solution under stirring over 10 minutes to prepare a precursor. The precursor thus obtained was calcined in the air at 400° C. for 5 hours, pulverized in an automatic mortar, further calcined in the air at 800° C. for 2 hours, and pulverized in an automatic mortar, to thereby give a composite oxide.

The composite oxide thus obtained was subjected to the same measurements as in Example 1. The results are shown in Table 2.

Comparative Examples 3 to 5

Composite oxides were prepared in the same way as in Examples 6 to 8, except that the calcination at 1200° C. for 2 hours was replaced with calcination at 800° C. for 3 hours. The composite oxides thus obtained were subjected to the same measurements as in Example 1. The results are shown in Table 2.

Comparative Examples 6 and 7

Composite oxides were prepared in the same way as in Comparative Example 2, except that the composition of each starting material aqueous solution was as shown in Table 2. The composite oxides thus obtained were subjected to the same measurements as in Example 1. The results are shown in Table 2.

Comparative Examples 8 to 14

10 g of the composite oxide prepared in each of Comparative Example 1 to 7 was calcined at 800° C. for 1 hour in a flow of hydrogen at 2 l/min, and then calcined in the air at 700° C. for 5 hours, to thereby give a composite oxide. The composite oxides thus obtained were subjected to the same measurements as in Example 1. The results are shown in Table 2.

Comparative Examples 15 to 17

Composite oxides were prepared in the same way as in Comparative Examples 2, 6, and 7, except that the calcination at 800° C. for 2 hours was replaced with calcination at 1200° C. for 2 hours. The composite oxides thus obtained were subjected to the same measurements as in Example 1. The results are shown in Table 2.

TABLE 2

| | Ce (at %) | Pr (at %) | Zr (at %) | M (at %) | Electron diffraction pattern | Presence/absence of zirconia tetragonal crystal phase | Oxygen desorption at 200° C. (μmol/g) | Oxygen desorption at 400° C. (μmol/g) | Oxygen desorption at 700° C. (μmol/g) | Specific surface area (m²/g) |
|---|---|---|---|---|---|---|---|---|---|---|
| Comp Ex. 1 | 50 | | 48 | Co(2) | ring-shaped | absent | 0 | 12 | 278 | 6 |
| Comp Ex. 2 | 80 | | 20 | | ring-shaped | absent | 0 | 8 | 196 | 4 |
| Comp Ex. 3 | | 50 | 50 | | ring-shaped | absent | 0 | 18 | 352 | 7 |
| Comp Ex. 4 | | 70 | 30 | | ring-shaped | absent | 0 | 21 | 268 | 5 |
| Comp Ex. 5 | | 80 | 20 | | ring-shaped | absent | 0 | 25 | 303 | 8 |
| Comp Ex. 6 | 30 | 20 | 49 | Ni(1) | ring-shaped | absent | 0 | 31 | 356 | 12 |
| Comp Ex. 7 | 30 | 50 | 20 | | ring-shaped | absent | 0 | 9 | 176 | 10 |
| Comp Ex. 8 | 50 | | 48 | Co(2) | ring-shaped | absent | 0 | 12 | 143 | 9 |
| Comp Ex. 9 | 80 | | 20 | | ring-shaped | absent | 0 | 7 | 187 | 4 |
| Comp Ex. 10 | | 50 | 50 | | ring-shaped | absent | 0 | 15 | 324 | 8 |
| Comp Ex. 11 | | 70 | 30 | | ring-shaped | absent | 0 | 18 | 231 | 3 |
| Comp Ex. 12 | | 80 | 20 | | ring-shaped | absent | 0 | 23 | 275 | 9 |
| Comp Ex. 13 | 30 | 20 | 49 | Ni(1) | ring-shaped | absent | 0 | 36 | 342 | 11 |
| Comp Ex. 14 | 30 | 50 | 20 | | ring-shaped | absent | 0 | 12 | 185 | 10 |
| Comp Ex. 15 | 80 | | 20 | | spots | present | 0 | 7 | 178 | 0.2 |
| Comp Ex. 16 | 30 | 20 | 49 | Ni(1) | spots | present | 0 | 26 | 297 | 0.1 |
| Comp Ex. 17 | 30 | 50 | 20 | | spots | present | 0 | 6 | 155 | 0.2 |

What is claimed is:

1. A composite oxide comprising:
oxygen,
R consisting of at least one element selected from Ce and Pr, and
Zr,
wherein a content of R is not less than 10 at % and not more than 90 at % and a content of Zr is not less than 10 at % and not more than 90 at %, with a total amount of elements other than oxygen being 100 at %,
wherein said composite oxide is free of a tetragonal crystal phase originated from zirconium oxide,
wherein an electron diffraction pattern of said composite oxide appears as dotted diffraction spots, and
wherein said composite oxide has a specific surface area of not larger than 2 m²/g.

2. The composite oxide according to claim 1, wherein an amount of oxygen desorbed by said composite oxide at 400° C. is not less than 300 μmol/g.

3. The composite oxide according to claim 2, wherein a content of Ce is not less than 0 at % and not more than 70 at %, a content of Pr is not less than 20 at % and not more than 90 at %, a content of Zr is not less than 10 at % and not more than 80 at %, and a content of R is not less than 20 at % and not more than 90 at %, with the total amount of elements other than oxygen being 100 at %.

4. The composite oxide according to claim 1, wherein an amount of oxygen desorbed by said composite oxide at 700° C. is not less than 600 μmol/g.

5. The composite oxide according to claim 4, wherein a content of Ce is not less than 20 at % and not more than 90 at %, a content of Pr is not less than 0 at % and not more than 70 at %, a content of Zr is not less than 10 at % and not more than 70 at %, and a content of R is not less than 30 at % and not more than 90 at %, with the total amount of elements other than oxygen being 100 at %.

6. The composite oxide according to claim 1, wherein an amount of oxygen desorbed by said composite oxide at 400° C. is not less than 300 μmol/g, and at 700° C. is not less than 600 μmol/g.

7. The composite oxide according to claim 6, wherein a content of Ce is not less than 20 at % and not more than 90 at %, a content of Pr is not less than 0 at % and not more than 70 at %, a content of Zr is not less than 10 at % and not more than 60 at %, and a content of R is not less than 40 at % and not more than 90 at %, with the total amount of elements other than oxygen being 100 at %.

8. A composite oxide comprising:
oxygen,
R consisting of at least one element selected from Ce and Pr,
Zr, and
M consisting of at least one element selected from the group consisting of alkaline earth metals, rare earth elements other than R, transition metal elements other than rare earth elements and Zr, halogen elements, B, C, Si, and S,
wherein a content of R is not less than 10 at % and not more than 90 at %, a content of Zr is not less than 10 at % and less than 90 at %, and a content of M is more than 0 at % and not more than 20 at %, with a total amount of elements other than oxygen being 100 at %,
wherein said composite oxide is free of a tetragonal crystal phase originated from zirconium oxide,
wherein an electron diffraction pattern of said composite oxide appears as dotted diffraction spots, and
wherein said composite oxide has a specific surface area of not larger than 2 m²/g.

9. The composite oxide according to claim 8, wherein an amount of oxygen desorbed by said composite oxide at 400° C. is not less than 300 μmol/g.

10. The composite oxide according to claim 9, wherein a content of Ce is not less than 0 at % and not more than 70 at %, a content of Pr is not less than 20 at % and not more than 90 at %, a content of Zr is not less than 10 at % and less than 80 at %, a content of M is more than 0 at % and not more than 20 at %, and a content of R is not less than 20 at % and not more than 90 at %, with the total amount of elements other than oxygen being 100 at %.

11. The composite oxide according to claim 8, wherein an amount of oxygen desorbed by said composite oxide at 700° C. is not less than 600 µmol/g.

12. The composite oxide according to claim 11, wherein a content of Ce is not less than 20 at % and not more than 90 at %, a content of Pr is not less than 0 at % and not more than 70 at %, a content of Zr is not less than 10 at % and less than 70 at %, a content of M is more than 0 at % and not more than 20 at %, and a content of R is not less than 30 at % and not more than 90 at %, with the total amount of elements other than oxygen being 100 at %.

13. The composite oxide according to claim 8, wherein an amount of oxygen desorbed by said composite oxide at 400° C. is not less than 300 µmol/g and at 700° C. is not less than 600 µmol/g.

14. The composite oxide according to claim 13, wherein a content of Ce is not less than 20 at % and not more than 90 at %, a content of Pr is not less than 0 at % and not more than 70 at %, a content of Zr is not less than 10 at % and less than 60 at %, a content of M is more than 0 at % and not more than 20 at %, and a content of R is not less than 40 at % and not more than 90 at %, with the total amount of elements other than oxygen being 100 at %.

* * * * *